(12) United States Patent
Evans

(10) Patent No.: US 7,702,586 B2
(45) Date of Patent: Apr. 20, 2010

(54) RESERVE ACCOUNT MORTGAGE METHOD AND SYSTEM

(75) Inventor: Thomas M. Evans, Scotts Valley, CA (US)

(73) Assignee: Tax Lifeboat, Inc., Scotts Valley, CA (US)

( * ) Notice: Subject to any disclaimer, the term of this patent is extended or adjusted under 35 U.S.C. 154(b) by 0 days.

(21) Appl. No.: 12/154,505

(22) Filed: May 23, 2008

(65) Prior Publication Data

US 2008/0294553 A1  Nov. 27, 2008

Related U.S. Application Data

(60) Provisional application No. 60/931,776, filed on May 25, 2007.

(51) Int. Cl.
*G06Q 40/00* (2006.01)
(52) U.S. Cl. .............................. 705/40; 705/35; 705/41; 707/104.1
(58) Field of Classification Search ............... 705/1–80; 707/5, E17.009, 104.1; 370/230
See application file for complete search history.

(56) References Cited

U.S. PATENT DOCUMENTS

2008/0052224 A1* 2/2008 Parker .......................... 705/38

OTHER PUBLICATIONS

Theresa Singleton, Subprime and Predatory Lending in Rural America, Fall 2006, Carsey Institute, pp. 1-5.*

* cited by examiner

*Primary Examiner*—James P Trammell
*Assistant Examiner*—Marissa Liu
(74) *Attorney, Agent, or Firm*—Hall Estill; William C. Milks, III

(57) ABSTRACT

A method and system are provided to resolve financial problems and/or discretionary financial decisions by mortgagors and other borrowers. If a mortgage is current, then any extra money received from the mortgagor is automatically credited to a reserve account, which pays down the mortgage principal. If a mortgage payment is due but has not been paid or is only partially paid, then whatever money is needed for the mortgage payment is automatically deducted from the reserve account and applied toward the mortgage payment, thereby increasing the loan principal. As a limit, if the reserve account is depleted, the lender may commence conventional foreclosure procedures. The method and system can similarly be applied to other types of loans.

14 Claims, 2 Drawing Sheets

RESERVE ACCOUNT MORTGAGE METHOD AND SYSTEM

CROSS-REFERENCE TO RELATED PATENT APPLICATION

This application relates to U.S. Provisional Patent Application No. 60/931,776 filed on May 25, 2007, entitled RESERVE ACCOUNT MORTGAGE, which is hereby incorporated herein in its entirety by this reference.

BACKGROUND OF THE INVENTION

1. Field of the Invention

The present invention relates generally to financial loans and, more particularly, to a method and system for the purpose of assisting one or more mortgagors or other borrowers in flexibly managing their financial affairs. One preferred embodiment of the present invention provides a method and system for storing mortgage or other loan account data, collecting mortgage or other loan payments including additional amounts credited to the mortgage or loan account, and enabling mortgagors or borrowers to access the additional credited amounts to cover future mortgage or other loan payments or for any other purpose at the election of the mortgagor or borrower.

2. References

U.S. Patents No.:
U.S. Pat. No. 7,089,503
U.S. Pat. No. 6,315,196
U.S. Pat. No. 6,298,335
U.S. Pat. No. 6,269,347
U.S. Pat. No. 6,138,102
U.S. Pat. No. 6,012,047
U.S. Pat. No. 5,987,436
U.S. Pat. No. 5,946,668
U.S. Pat. No. 5,884,285
U.S. Pat. No. 5,832,461
U.S. Pat. No. 5,742,775
U.S. Pat. No. 5,689,649
U.S. Pat. No. 4,876,648
U.S. Published Patent Applications No.:
2007/0106603
2007/0011084
2007/0011085
2006/0229975
2006/0212393
2006/0184450
2006/0020532
2005/0027647
2004/0254878
2003/0028478
2001/0013017

3. Description of the Prior Art

Today, mortgages and other loans are not as consumer-friendly as they could be. For example, late payments adversely impact a credit rating of a homeowner who has a mortgage. Generally, prepayment of a portion of the mortgage loan (if permitted) reduces the mortgage principal and subsequent monthly payments, but cannot be used for other purposes.

Thus, if the mortgagor is laid off or has other financial difficulties, his or her home is soon subject to foreclosure and sale—regardless of how much equity he/she has in the home. In such a case, a potential alternative is to refinance. However, being unemployed and having recent late payments on his or her record exposes the mortgagor to very adverse interest rates and terms or to being rejected for a refinance.

Thus, for all these reasons, it would be desirable to provide a method and system which overcome the above problems that may be encountered by mortgagors and that may be encountered by borrowers on other loans, as well. It is to this end that the present invention is directed. The various embodiments of the present invention have many advantages by providing a flexible method and system to manage financial demands for mortgagors or other borrowers.

SUMMARY OF THE INVENTION

One embodiment of the method and system in accordance with the present invention provides many advantages in resolving financial problems and/or discretionary financial decisions by mortgagors and other borrowers, which make the method and system in accordance with the present invention useful to mortgagors and other borrowers, as well as financial institutions assisting mortgagors and other borrowers. One embodiment of the present invention provides a "Reserve Account Mortgage (RAM)" method and system that solve the above problems while incurring little cost or risk to lenders. With a RAM, a mortgagor may prepay a portion of his or her mortgage, thereby creating a "reserve account." The same principles also apply to other loans.

Considered in more detail, in the exemplary embodiment of a mortgage, if the mortgage is current, then any extra money received from the mortgagor is automatically credited to the reserve account, which pays down the mortgage principal. If a mortgage payment is due but has not been paid or is only partially paid, then whatever money is needed for the mortgage payment is automatically deducted from the reserve account and applied toward the payment, thereby increasing the loan principal. As a limit, if the reserve account is depleted, the lender may commence conventional foreclosure procedures. The principles of the present invention can similarly be applied to other types of loans.

The foregoing and other objects, features, and advantages of the present invention will become more readily apparent from the following detailed description of various embodiments, which proceeds with reference to the accompanying drawing.

BRIEF DESCRIPTION OF THE DRAWING

The various embodiments of the present invention will be described in conjunction with the accompanying figures of the drawing to facilitate an understanding of the present invention. In the figures, like reference numerals refer to like elements. In the drawing.

DETAILED DESCRIPTION OF THE PREFERRED EMBODIMENTS

Figure 1:
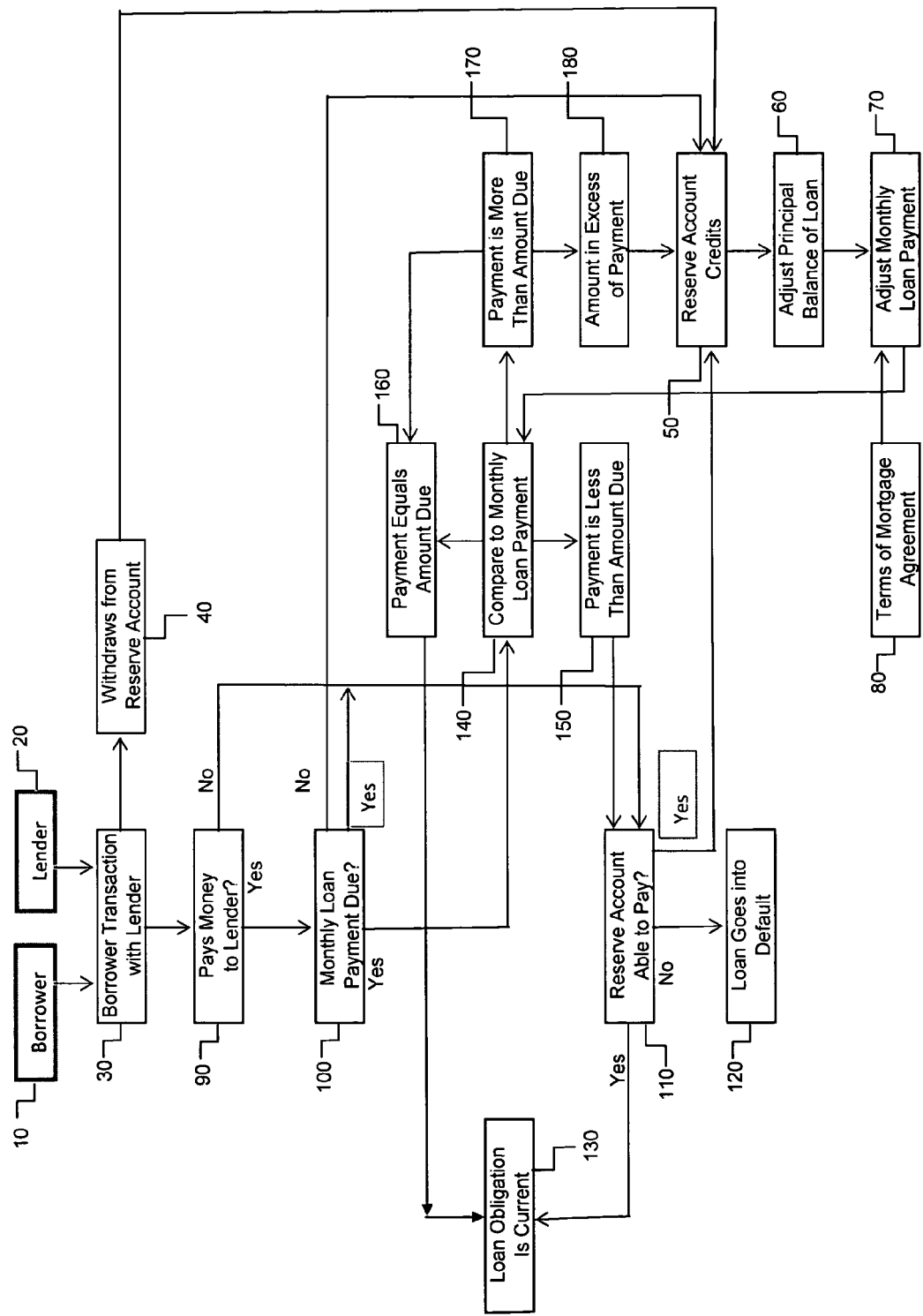
FIG. 1 is an overview flowchart of one embodiment of the reserve account mortgage or loan method in accordance with the present invention.

The reserve account mortgage or loan method in accordance with one preferred embodiment of the present invention comprises a plurality of process steps. FIG. 1 is a diagram of the flowchart of a preferred embodiment of a reserve account mortgage process. In the description that follows, the terms "mortgage" and "loan," "mortgagor" and "borrower," and "mortgagee" and "lender" are to be understood to be interchangeable.

FIG. 1 shows the process steps for a preferred embodiment of the reserve account mortgage (hereafter referred to as the "RAM"). By way of example, but not limitation, the RAM process as show in the illustrated embodiment is a residential mortgage. Other embodiments may be for car and other consumer loans, as well as commercial and business loans.

The purpose of the RAM is to allow a mortgagor or borrower 10 to prepay a portion of his or her mortgage with the mortgagee or lender 20 and be able to access those prepaid funds when needed. Thus, the prepayments are credited to a reserve account 50 of the borrower 10. Also, amounts added to the reserve account 50 reduce the principal balance 60 of the mortgage or loan of the borrower and decrease the monthly mortgage payment 70, as will be further described below.

As shown in FIG. 1, the borrower 10 may initiate a transaction 30 with the lender 20. For example, the borrower 10 may submit a payment 90. To the limit that credits are available in the reserve account 50, the lender 20 automatically deducts funds from the reserve account 50 in the event the monthly mortgage or loan payment is late or not paid in full, as will be further described below. Alternatively, at his or her option, the borrower 10 may preferably withdraw funds 40 from the reserve account 50 and use the funds for any other purpose. Decreasing credits in the reserve account 50 increases the principal balance 60 of the mortgage or loan and raises the monthly mortgage or loan payment 70, as will be further described below.

The amount that the monthly mortgage payment is reduced by prepayments to, or, conversely, increased by withdrawing money from, the reserve account 50, also depends on the terms of the mortgage or loan agreement 80. For example, the mortgage or loan terms may have fixed or variable interest rates, which are taken into account. The lender 20 may also charge transaction fees for prepayments or deductions or withdrawals from the reserve account 50.

If the borrower 10 does not make a payment 90 to the lender 20 and a monthly mortgage or loan payment is due 100, the lender 20 determines if the reserve account 50 has sufficient credits to pay the monthly payment 110. If credit funds are available, the reserve account 50 is reduced by the amount of the payment, and the mortgage or loan obligation is kept current 130. If sufficient funds are not available 110, the loan goes into default 120.

If the borrower 10 makes a payment 90 to the lender 20 and a monthly mortgage or loan payment is not due 100, the lender 20 credits the amount paid to the reserve account 50. Accordingly, the mortgagor or borrower may preferably increase the credits in the reserve account 50 at any time.

Considered in more detail, if the borrower 10 makes a payment 90 to the lender 20 and a monthly mortgage or loan payment is due 100, the lender 20 compares the amount paid 140 to the monthly mortgage or loan payment that is due. If the payment is less than the amount due 150, then the lender 20 determines if the reserve account 50 has sufficient credits to pay the shortfall in the monthly payment 110. If the credit funds are available, the reserve account 50 is reduced by the amount of the shortfall, and the mortgage or loan obligation is kept current 130. If sufficient funds are not available 110, the loan goes into default 120. If the payment equals the amount due 160, then the monthly mortgage or loan payment is accepted, and the mortgage or loan obligation is kept current 130. Finally, if the payment is more than the amount due 170, then the amount of the monthly mortgage or loan payment is paid 160, and the excess funds are credited 180 to the reserve account 50.

Thus, the RAM provides numerous advantages. These advantages may include:

1. No Late Payments or Fees If a borrower's payment is late, the lender automatically deducts it from the borrower's reserve account. This transaction does not result in a late-payment notation on the borrower's credit report or any additional fees. The draw-down keeps the mortgage current so, when the late payment arrives, it restores the balance in the reserve account.
2. Longer-Term Financial Protection Assume a worker estimates it would take six months to find another job if he or she were laid off. Building up a reserve account of six months' payments (or more) would protect the borrower from losing his or her home should this or a similar event happen. This "safety net" could prevent the loss of one's life savings invested in a home and having to start over.
3. Emergency Source of Cash The reserve account serves as a source of emergency cash. For instance, an unexpected car repair could be paid by not making a mortgage payment that month and, instead, having the mortgage payment deducted from the reserve account.
4. Mortgage Pay Down The advantages of accelerating the repayment of principal are well-documented and understood by persons skilled in the art. Just making one additional payment per year, turns a 30-year mortgage into one that's discharged in 17 years. Thus, paying into a reserve account lowers future monthly payments and amortizes the loan at a faster rate. Extra payments may be scheduled as a payroll deduction or periodic lump-sum contributions.
5. Higher Earnings Rate Most liquid assets (e.g., bank accounts, money market funds, and the like) earn an interest rate lower than what people pay on their mortgages. Therefore, money in the reserve account "earns" them a higher return since it saves having to pay the mortgage rate of interest on those funds.
6. Universal Applicability The RAM may be viewed as a "plug-in" feature that can be used with any type of mortgage (e.g., fixed rate, variable rate, negative amortization, and others). Indeed, reserve accounts may also be applied to car loans, credit card accounts, and leases, as well as most any type of consumer and business debt obligation.
7. Minimal Added Costs or Risk for Lenders There will be additional recordkeeping by lenders, but this may be easily computerized with only a minor increase in costs. It's contemplated that lenders could regard the draw-down of a reserve account as another loan transaction with its own borrower risks, appraisal requirement, costs, etc. However, the reserve account assures that the loan balance is kept at or below the amortized payback amount at all times. If not, the loan goes into default, and normal foreclosure procedures are triggered.
8. Lower Foreclosure Rates The RAM will likely reduce the number of foreclosures and, thereby, significantly cut the collection and asset recovery costs of financial institutions.
9. Counter-Cyclic Economic Tool RAM-type loans may lessen economic downturns and help slow the economy during rapid growth. For example, in good times borrowers will save more (add to their reserve accounts) thus slowing the business cycle. In a recession, distressed borrows will draw down their reserve accounts and avoid further depressing the economy with home foreclosures and loan defaults.
10. Increased Savings Rate Americans are faulted for not saving enough as a nation. However, the incentives provided by a RAM should boost the aggregate savings rate, which increases long-term economic growth.
11. Legislative Appeal The prospect for significant benefits to consumers, probable net gains for lenders, fewer foreclosures, higher savings, and better economic stability would likely receive substantial support from state and Federal legislators. Tops-down pressure from government and bottoms-up demand from borrowers may accelerate any approval processes for this new type of mortgage.
12. Borrower Acceptance Estimates are there would be very high demand for a mortgage that delivers the benefits of a RAM.

Additionally, the reserve account mortgage or loan method is particularly adaptable to computer software executed by a computer for managing mortgage accounts, and it is in this context that the preferred embodiment of the system in accordance with the present invention will be described. It will be appreciated, however, that the reserve account mortgage system in accordance with the present invention has greater utility, since the system may be used for other types of loans not specifically described herein. Accordingly, the embodiments of the reserve account mortgage system in accordance with the present invention is an example only, and is not intended to limit the scope of the present invention to managing mortgage accounts, as the principles of the present invention apply generally to managing any type of loan.

Figure 2:
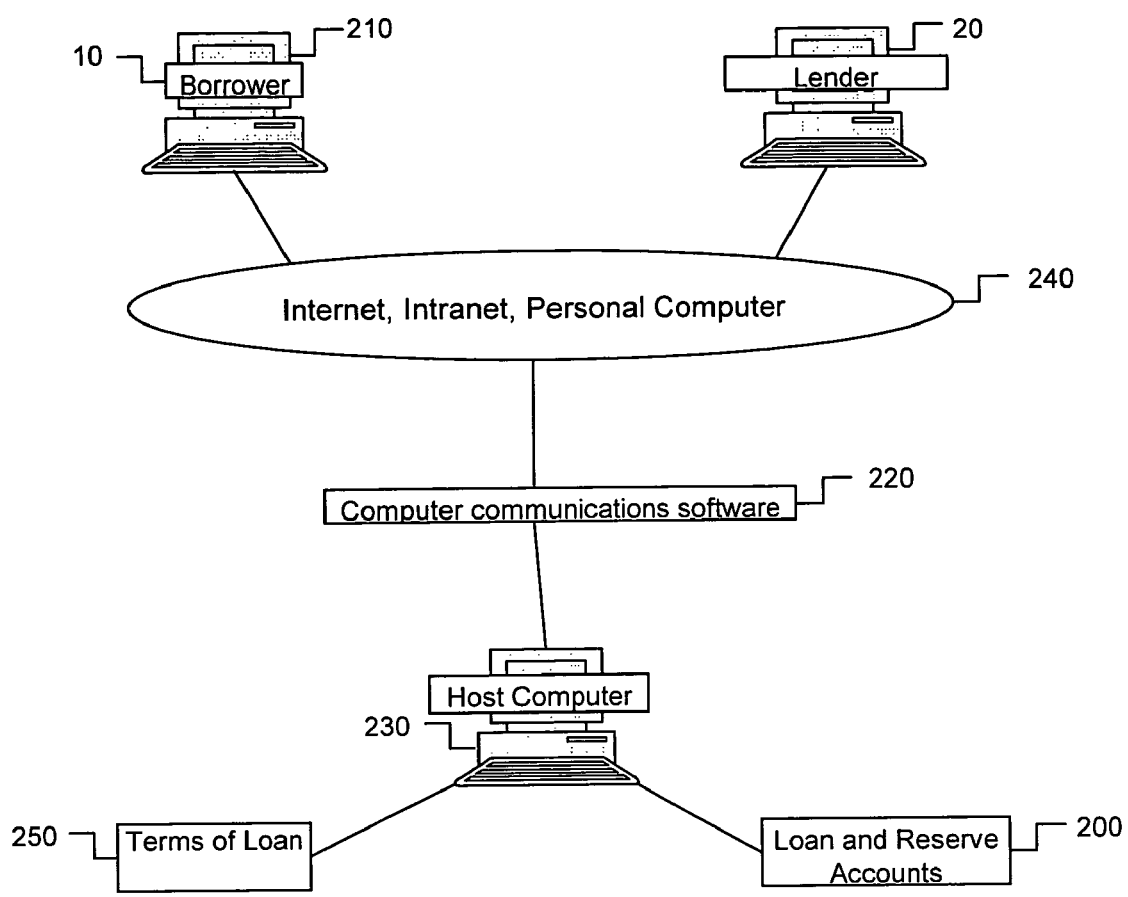
FIG. 2 is a block diagram of one embodiment of the reserve account mortgage or loan system in accordance with the present invention.

Referring now to FIG. 2, various components of a preferred embodiment of a reserve account mortgage or loan system in accordance with the present invention is shown. Generally, the purpose of the reserve account mortgage or loan system is to enable at least one borrower 10 to manage his or her finances by having a reserve account maintained in a database 200 pursuant to loan terms 250. Such borrowers 10 may include an individual(s) and/or a small business(es) who are mortgagors or who have other loan obligations. The reserve account mortgage or loan system provides a platform which enables efficient interaction between a borrower 10 and a lender 20, as follows.

As shown in FIG. 2, a borrower may access and interact with the reserve account mortgage or loan system by a communication medium such as the Internet (including the World Wide Web) or intranet and personal computer 210, or any other electronic techniques and devices that have communication capability with Internet, intranet, or television, for example, such as personal computers, personal data assistants (PDA's), cellular telephones, and other personal communication equipment and computer communications software 220 that interfaces the borrower 10 and a host computer 230.

The reserve account mortgage or loan system preferably comprises a software application operating on the host computer 230, as shown in FIG. 2. For example, the host computer 230 may be any personal computer having at least 256 megabytes of random access memory and preferably includes one gigabyte of random access memory. The reserve account mortgage or loan system in accordance with one exemplary implementation of the present invention is a 32-bit software application compatible with a Microsoft Windows 2000 or Windows NT or later operating system available from Microsoft Corporation located in Redmond, Wash. The host computer 230 also preferably comprises a hard disk drive having at least 40 gigabytes of free storage space available. The host computer 230 is provided with the Internet or World Wide Web or intranet connection 240 for connection to one or more borrowers 10. The connection 240 comprises a high-speed connection, for example, a DSL or greater connection, and is preferably a T1 or faster connection. In the preferred embodiment of the reserve account mortgage or loan system, borrowers 10 can be ported to the Internet or World Wide Web or intranet and responses to inquiries and payments and other transactions may be performed by the host computer 230. In another embodiment of the reserve account mortgage or loan system, responses to inquiries and payments and other transactions may be preformed by personal computers 210 associated with borrowers, such as withdrawing credit funds from the mortgage reserve account for other purposes.

As mentioned earlier, the reserve account mortgage or loan system also comprises computer software or code. In the preferred embodiment, the reserve account mortgage or loan system computer software or code can be a hosted application that runs on the host computer 230. In an alternative embodiment, the software or code can comprise a client installed on or downloaded to the personal computers 210 of borrowers and executed locally. Thus, the computer software or code may be initially supplied to borrowers on a CD-ROM or other electronic medium or downloadable over the Internet or World Wide Web or intranet 240.

In accordance with one embodiment of the reserve account mortgage or loan system of the present invention, the software or code may additionally comprise other software applications such as word processing and spreadsheet application software. One example of a word processor that can be utilized in the various embodiments of the reserve account mortgage or loan system in accordance with the present invention is Word, and one example of a spreadsheet is Excel, both commercially available from Microsoft Corporation.

While the foregoing description has been with reference to particular embodiments of the present invention, it will be appreciated by those skilled in the art that changes in these embodiments may be made without departing from the principles and spirit of the invention. Accordingly, the scope of the present invention can only be ascertained with reference to the appended claims.

What is claimed is:

1. A method by which a borrower may initiate a transaction with a lender relating to a mortgage or other loan, comprising the steps of:
   the lender establishing a reserve account comprising an account into which one or more prepayments of the mortgage or other loan are accumulated to establish credit funds;
   the borrower submitting or causing to be submitted a payment to the lender;
   to a limit that credit funds are available in the reserve account, the lender automatically by computer deducting credit funds from the reserve account if the payment is late or not paid in full;
   decreasing credit funds by computer in the reserve account, increasing a balance of the mortgage or loan owed, and raising a mortgage or loan payment in response to the deduction of credit funds in the reserve account;
   if credit funds are available, decreasing the reserve account by an amount equal to the payment or a shortfall in the amount paid and keeping the mortgage or loan obligation from default; and
   if credit funds are not available, defaulting the mortgage or loan.

2. The method of claim 1 wherein if the borrower submits the payment to the lender and a payment is not due, further comprising the step of the lender crediting the amount paid to the reserve account, the borrower thereby increasing the credit funds in the reserve account.

3. The method of claim 1 wherein if the borrower submits a payment to the lender and a payment is due, further comprising the steps of the lender:
comparing the amount paid to the payment that is due;
if the payment is less than the amount due, the lender:
determining if the reserve account has credit funds to pay a shortfall in the payment;
if credit funds are available, decreasing the reserve account by the amount of the shortfall; and
keeping the loan obligation from default;
if credit funds are not available, the lender defaulting the loan;
if the payment equals the amount due, the lender:
accepting the loan payment; and
keeping the loan obligation from default; and
if the payment is more than the amount due, the lender:
accepting the loan payment;
crediting the excess funds to the reserve account; and
keeping the loan obligation from default; and
wherein if the borrower does not make a payment to the lender and a payment is due, the lender:
determining if the reserve account has credit funds to pay the payment;
if credit funds are available, decreasing the reserve account by the amount of the payment that is due; and
keeping the loan obligation from default; and
if credit funds are not available, the lender defaulting the loan.

4. The method of claim 1, further comprising the step of enabling the borrower at his or her option to withdraw funds from the reserve account to use the funds for another purpose.

5. The method of claim 1 wherein the amount that the mortgage or loan payment is reduced by prepayments to or, conversely, increased by withdrawing funds from, the reserve account depends on the terms of a mortgage or loan agreement, respectively.

6. The method of claim 5 wherein the mortgage or loan terms have fixed or variable interest rates which are taken into account.

7. The method of claim 5, further comprising the step of the lender charging transaction fees for prepayments or deductions or withdrawals from the reserve account.

8. A system by which a borrower may initiate a transaction with a lender relating to a mortgage or other loan, comprising:
means for the lender establishing a reserve account comprising an account into which one or more prepayments of the mortgage or other loan are accumulated to establish credit funds;
means for the borrower submitting or causing to be submitted a payment to the lender;
to a limit that credit funds are available in the reserve account, means for the lender automatically deducting credit funds from the reserve account if the payment is late or not paid in full;
means for decreasing credit funds in the reserve account, increasing a balance of the mortgage or loan owed, and raising a mortgage or loan payment in response to the deduction of credit funds in the reserve account;
if credit funds are available, means for decreasing the reserve account by an amount equal to the payment or a shortfall in the amount paid and keeping the mortgage or loan obligation from default; and
if credit funds are not available, means for defaulting the mortgage or loan.

9. The system of claim 8 wherein if the borrower submits the payment to the lender and a payment is not due, further comprising means for the lender crediting the amount paid to the reserve account, whereby the borrower increases the credit funds in the reserve account.

10. The system of claim 8 wherein if the borrower submits a payment to the lender and a payment is due, further comprising means for the lender:
comparing the amount paid to the payment that is due;
if the payment is less than the amount due, means for the lender:
determining if the reserve account has credit funds to pay a shortfall in the payment;
if credit funds are available, decreasing the reserve account by the amount of the shortfall; and
keeping the loan obligation from default;
if credit funds are not available, means for the lender defaulting the loan;
if the payment equals the amount due, means for the lender:
accepting the loan payment; and
keeping the loan obligation from default; and
if the payment is more than the amount due, means for the lender:
accepting the loan payment;
crediting the excess funds to the reserve account; and
keeping the loan obligation from default; and
wherein if the borrower does not make a payment to the lender and a payment is due, means for the lender:
determining if the reserve account has credit funds to pay the payment;
if credit funds are available, decreasing the reserve account by the amount of the payment that is due; and
keeping the loan obligation from default; and
if credit funds are not available, means for the lender defaulting the loan.

11. The system of claim 8, further comprising means for enabling the borrower at his or her option to withdraw funds from the reserve account to use the funds for another purpose.

12. The system of claim 8 wherein the amount that the mortgage or loan payment is reduced by prepayments to or, conversely, increased by withdrawing funds from, the reserve account depends on the terms of a mortgage or loan agreement, respectively.

13. The method of claim 12 wherein the mortgage or loan terms have fixed or variable interest rates which are taken into account.

14. The method of claim 13, further comprising means for the lender charging transaction fees for prepayments or deductions or withdrawals from the reserve account.

* * * * *